United States Patent [19]
Walton et al.

[11] Patent Number: 5,171,803
[45] Date of Patent: Dec. 15, 1992

[54] COPOLYMER WITH SIDE CHAINS EXHIBITING NONLINEAR OPTICAL RESPONSE

[75] Inventors: Connie R. Walton, Frankfurt am Main, Fed. Rep. of Germany; Brian B. Marr, Annandale; Anthony J. East, Madison, both of N.J.

[73] Assignee: Hoechst Celanese Corp., Somerville

[21] Appl. No.: 705,426

[22] Filed: May 24, 1991

[51] Int. Cl.$^5$ ............................................. C08F 226/06
[52] U.S. Cl. ...................................... 526/243; 526/245; 526/248; 526/259; 526/298; 526/311
[58] Field of Search ................ 526/259, 248, 243, 245

[56] References Cited
U.S. PATENT DOCUMENTS
5,041,509  8/1991  Lee et al. ........................... 525/243

Primary Examiner—Joseph L. Schofer
Assistant Examiner—M. Nagumo
Attorney, Agent, or Firm—M. W. Ferrell

[57] ABSTRACT

In one embodiment this invention provides novel side chain copolymers which exhibit nonlinear optical response, and which have utility as a transparent optical component in all-optical and electrooptical light switch and light modulator devices.

The invention side chain copolymer is illustrated by the following structure:

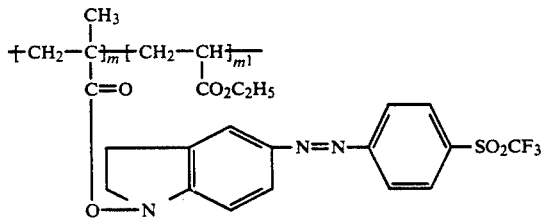

10 Claims, No Drawings

COPOLYMER WITH SIDE CHAINS EXHIBITING NONLINEAR OPTICAL RESPONSE

CROSS-REFERENCE TO RELATED PATENT APPLICATIONS

The present patent application has subject matter related to the disclosure of copending patent application Ser. No. 477,267, filed Feb. 7, 1990, now U.S. Pat. No. 5,041,509.

BACKGROUND OF THE INVENTION

Polymers with a comb structure of pendant side chains are a new class of organic materials which exhibit interesting optical properties.

Comb-like liquid crystalline polymers are described in Eur. Polym. J., 18, 651 (1982); Advanced Polymer Science, Liquid Crystal Polymers II/III, Springer-Verlag, New York (1984), pages 215-220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties. U.S. Pat. No. 4,792,208 discloses nonlinear optically responsive organic compounds and side chain polymers in which the molecular dipoles have an electron donor moiety linked through a conjugated bonding system to an electron accepter sulfonyl moiety. Japanese Pat. No. 88175834 discloses an acrylate polymer which has nitro(ethylhydroxyethylamino)azobenzene side chains.

Nonlinear optical properties of organic and polymeric materials was the subject of a symposium sponsored by the ACS division of Polymer Chemistry at the 18th meeting of the American Chemical Society, September, 1982. Papers presented at the meeting are published in ACS Symposium Series 233, American Chemical Society, Washington, D.C. 1983.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser-frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel optically responsive monomers and polymers.

It is another object of this invention to provide acrylic copolymers having side chains which exhibit nonlinear optical response.

It is a further object of this invention to provide optical light switch and light modulator devices with a transparent polymeric nonlinear optical component comprising a thin film of an acrylic copolymer with nonlinear optically-responsive pendant side chains which can be uniaxially oriented by an external field Other objects and advantages of the present invention shall become apparent from the accompanying description and examples

DESCRIPTION OF THE INVENTION one or more objects of the present invention are accomplished by the provision of an acrylic copolymer which is characterized by recurring monomeric units corresponding to the formula:

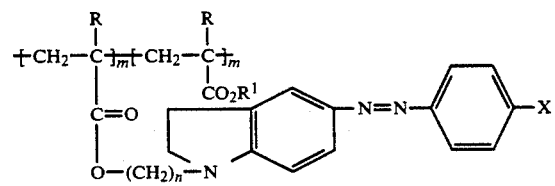

where R is hydrogen or a $C_1$–$C_4$ alkyl substituent; $R^1$ is a $C_1$–$C_6$ alkyl substituent; m and $m^1$ are integers which total at least 10; n is an integer between about 1—10; and X is —CN, —$NO_2$, —CH=C(CN)$_2$, —C(CN)=C(CN)$_2$, —$CF_3$ or —$SO_2CF_3$.

A typical copolymer of the present invention is amorphous and has a weight average molecular weight in the range between about 5000-200,000, and a glass transition temperature in the range between about 40°-150° C.

A present invention copolymer has pendant side chains which exhibit nonlinear optical susceptibility $\beta$. A copolymer can be formed into a nonlinear optical medium, such as a transparent film or coating on a substrate. A copolymer can be applied to a supporting substrate by conventional means, such as spin coating, spraying, Langmuir-Blodgett deposition, and the like.

A film or coating fabricated with a present invention copolymer exhibits third order nonlinear optical susceptibility A nonlinear optical medium of the present invention can be subjected to an electric field to uniaxially orient the copolymer side chains. In one method the polymer medium is heated close to or above the copolymer glass transition temperature $T_g$, then an external field (e.g., a DC electric field) is applied to the medium of mobile copolymer molecules to induce uniaxial molecular alignment of copolymer side chains parallel to the applied field, and the medium is cooled while maintaining the external field effect.

By this method a present invention nonlinear optical medium has a stable uniaxial alignment of copolymer side chains. The poled optical medium exhibits a second nonlinear optical susceptibility $\chi^{(2)}$. A present invention poled optical medium is capable of exhibiting a linear electrooptic coefficient or of at least about 20 pm/V as measured at 1.3 μm excitation wavelength.

In another embodiment this invention provides an optical light switch or light modulator device which contains a polymeric nonlinear optical component comprising a transparent solid medium of an amorphous acrylic copolymer with pendant side chains having a structure as described hereinabove.

In a present invention optical light switch or light modulator device, the polymeric nonlinear optical component can exhibit a light transmission optical loss of less than about one decibel per centimeter.

The term "transparent" as employed herein refers to a polymeric optical medium which is transparent or light transmitting with respect to incident fundamental and created light frequencies. In a present invention optical device, the copolymeric thin film nonlinear optical medium component is transparent to both the incident and exit light frequencies.

The term "amorphous" as employed herein refers to a transparent polymeric optical medium which does not have crystalline regions with a preferred short range molecular order and a higher density that can act as optically scattering centers.

The term "electric field" as employed herein refers to a high voltage electric field which is applied to a substrate of mobile molecules to induce dipolar alignment of the molecules parallel to the field.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as described in U.S. Pat. No. 4,775,215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; ACS Symposium Series 233 (1983).

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, Jun. 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

SYNTHESIS OF MONOMERS AND POLYMERS

An aniline compound which is para-substituted with an accepter group is synthesized if not commercially available. The para-substituted aniline is diazotized, and coupled with an appropriate hydroxyalkyl-substituted indoline to generate a hydroxyalkyl-substituted azobenzene. The azobenzene is esterified with an appropriate acryloyl chloride or anhydride to provide a monomer, and the monomer is copolymerized with an appropriate acrylate or alkylacrylate comonomer.

A. Intermediate

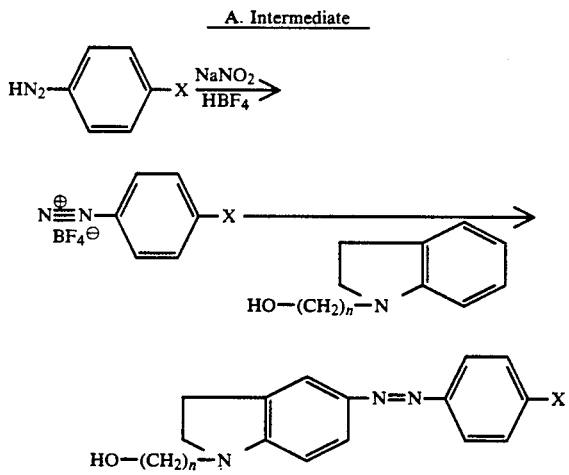

The substituent X is —CN, —NO$_2$, —CH=C(CN)$_2$, —C(CN)=C(CN)$_2$, —CF$_3$ or —SO$_2$CF$_3$.

Referring to the above reaction diagram, indoline alkylates readily by heating in the presence of a large excess of an omega-haloalcohol.

With respect to the electron-withdrawing group as represented by —X in the above reaction diagram, 4-dicyanovinylaniline is prepared by condensation of 4-acetamidobenzaldehyde with malononitrile. The acetamidodicyanovinylaniline intermediate is saponified to provide 4-dicyanovinylaniline product.

The triflone derivative of aniline is prepared by sulfonylation of a protected aniline with trifluoromethanesulfonic anhydride in the presence of a Lewis acid such as aluminum trichloride.

For structures wherein the —X substituent is a cyano or nitro group, commercially available 4-aminobenzonitrile and 4-nitroaniline respectively are used as starting materials.

B. Monomer and Copolymer

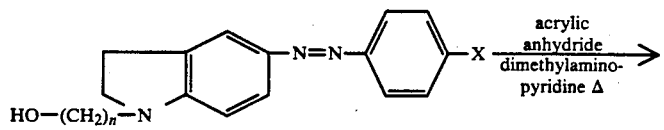

-continued

B. Monomer and Copolymer

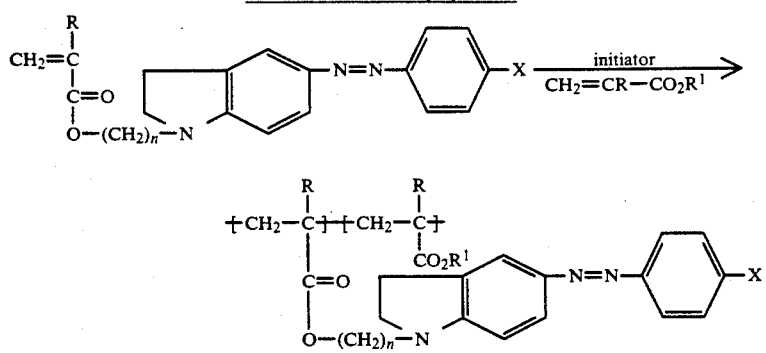

The substituent R' is a $C_1$-$C_6$ alkyl group.

The side chain copolymers of the present invention have a unique combination of physical and optical properties.

The azobenzene electronic structure in conjugation with electron-donating and electron-withdrawing substituents exhibits exceptional nonlinear optical susceptibility, e.g., an azobenzene-containing pendant side chain normally will exhibit a higher level of $\beta$ response than the closely related stilbene-containing structure in conjugation with comparable electron-donating and electron-withdrawing substituents. The azo bridge contributes to an enhancement of molecular nonlinear optical susceptibility by functioning as a strong electron withdrawing group. In a stilbene structure, the double bond is a relatively passive conduit for electron flow between the electron-donor and electron-withdrawing groups. As a further advantage the azobenzene structure is more easily synthesized than the corresponding stilbene structure, and the azobenzene moiety has excellent thermal, photochemical and hydrolytic stabilities.

An additional enhancement of molecular nonlinear optical susceptibility is contributed by the amino electron-donating group which is contained in an alicyclic structure. It has been found that an alicyclic amino group because of steric factors is a superior electron-donating group for purposes of increasing molecular nonlinear optical susceptibility than is a corresponding acyclic amino group in a conjugated electronic system.

The present invention copolymers with indoline-containing pendant side chains in comparison with closely related copolymers with tetrahydroquinoline-containing pendant side chains exhibit a superior combination of desirable properties, such as increased solubility in organic solvents, ease of acrylate monomer purification, a lower glass transition temperature which improves tractability and facilitates processing procedures, and superior resistance to thermal bleaching.

A present invention side chain copolymer in the form of a waveguiding medium has particular advantage in comparison with a medium of a liquid crystalline side chain polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

The following examples are further illustrative of the present invention. The components and specific ingredients are presented as being typical, and various modifications can be derived in view of the foregoing disclosure within the scope of the invention.

EXAMPLE I

Hydroxyethylinodoline

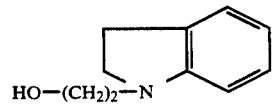

2-Bromoethanol (3 moles) is dissolved in 500 ml of methanol and charged to a round bottom flask reactor equipped with a mechanical stirrer, and sodium iodide (3 moles) is added to the flask contents. Potassium carbonate (3 moles) is added to the mixture and the reaction medium is heated to reflux. Indoline (2 moles) is added to the reaction medium at a slow rate which does not allow foaming. The reaction medium is refluxed for 6 hours, and then stirred at room temperature for about 18 hours.

The product mixture is extracted with ethyl acetate, and the extract solution is passed through silica gel. The solvent is removed under vacuum to provide a residual brown oil. The crude product is purified by Vacuum Distillation at a reduced pressure of 0.15 Torr. The product is collected at 100° C. in a 58% yield (99 mole % purity).

Corresponding indoline compounds are obtained by utilizing 4-bromobutanol or 6-bromohexanol in place of the 2-bromoethanol reactant.

EXAMPLE II 4-(Hydroxyethylindolinylazo)-4'-nitrobenzene

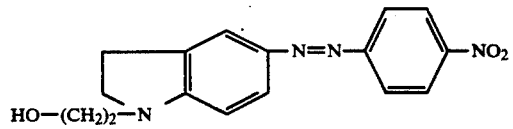

A. Diazonium Salt p-Nitroaniline (0.22 mole) is mixed with 170 ml of acetic acid. Fluoroboric acid (85 ml) is added to the 4-nitroaniline mixture and the resulting solution is chilled to a temperature below about 10° C.

Sodium nitrite (0.24 mole) is dissolved in water and chilled to below about 10° C. The chilled sodium nitrite solution is added slowly to the reaction medium which maintained the low temperature. The crude diazonium fluoroborate product is collected and washed with propionic acid, and maintained in a wet state with propionic acid.

B. Coupling Reaction

The diazonium salt is slurried in 400 ml of propionic acid and chilled. Hydroxyethyl-indoline (0.18 mole) is dissolved in propionic acid and chilled. The hydroyethylindoline solution is added slowly to the diazonium salt while maintaining the low temperature (<5° C.). The product mixture is stirred for one hour, as the medium warms slowly to room temperature. The product mixture is added to 3000 ml of a 1M sodium acetate solution. The crude product separates as a precipitate, and is collected by filtration. The product is purified by recrystallization from ethyl acetate, mp 166°-168° C. (36% yield; 95 mole % purity).

Corresponding indolinylazo-compounds are obtained by substituting 4-cyanoaniline, 4-trifluoromethylaniline, 4-tricyanovinylaniline or 4-trifluoromethanesulfonylaniline for the 4-nitroaniline reactant.

EXAMPLE III 4-(Methacroyloxyethylindolinylazo)-4'-nitrobenzene

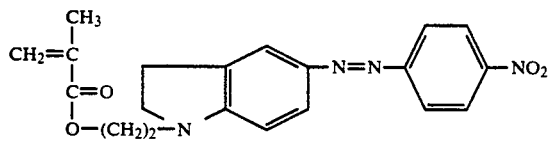

4-(Hydroxyethylindolinylazo)-4'-nitrobenzene (0.1762 mole) is partially dissolved in 1200 ml of ethyl acetate. A catalytic amount (0.0252 mole) of 4-dimethylaminopyridine and methacrylic anhydride (1.2 eq., 0.21 mole) are added, and the solution is heated at 50° C. for 2 hours. An additional 0.1 equivalent of methacrylic anhydride is added to the reaction mixture and heated for another hour.

The resulting product mixture is passed through silica gel, washed with water, and again passed through silica gel. The volume of the product mixture is reduced by evaporating off most of the solvent. The product mixture is poured into hexane, and the crude product which precipitates is collected by filtration. The monomer product is purified by recrystallizing it from acetonitrile/water, mp 130°-133° C. (65% yield; 96 mole % purity).

EXAMPLE IV

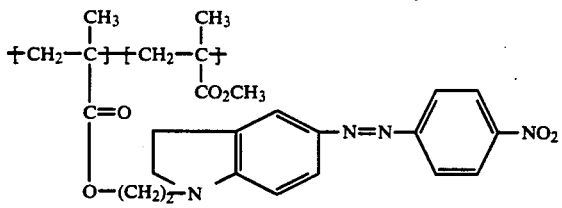

4-(Methacroyloxyethylindolinylazo)-4'-nitrobenzene (0.0507 mole) is mixed with toluene (100 ml), and the partial solution is purged with nitrogen for thirty minutes in a reactor. Methyl methacrylate (0.0507 mole) and azodiisobutyro-nitrile (0.001 mole) are added to the solution. The resulting reaction mixture is purged for an additional five minutes. The reactor is immersed in an oil bath (65° C.), and the reaction mixture is stirred for 72 hours.

The polymer product is precipitated by dripping the product solution into a volume of methanol. The crude polymer is purified by dissolving it in tetrahydrofuran and precipitating it in methanol (60% yield). $T_g = 135°$ C., weight average molecular weight of 58,000. The copolymer has a 56/44 ratio of azo monomer/MMA.

The r coefficient (when poled at 100 V/micron) is 18 pm/V. The r coefficient is measured on a film which is produced in the following manner, a 10% solution of the polymer in trichloropropane is spun on a ITO glass slide and spun for three seconds at 500 rpm, and for an additional 30 seconds at 2000 rpm. The two micron thick film is dried under nitrogen for three hours at 125° C. A top electrode (1×4 mm) which is a 1500 angstroms thick gold layer is coated on the polymer film. The film laminate is placed in a Mettler heating stage and heated to 120° C., and a DC field of 50 V/micron is applied for five minutes to the heated polymeric film. The film then is cooled while maintaining the applied DC field.

What is claimed is:

1. An acrylic copolymer provided with sidechains having a fused ring structure wherein a heterocyclic nitrogen is adjacent an aromatic ring which is characterized by recurring monomeric units corresponding to the formula:

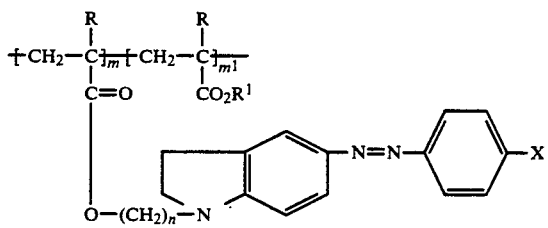

where R is hydrogen or a $C_1$-$C_4$ alkyl substituent; $R^1$ is a $C_1$-$C_6$ alkyl substituent; m and $m^1$ are integers which total at least 10; n is an integer between 1 and about 10 and X is —CN, —NO$_2$, —CH=C(CN)$_2$, —C(CN)$_2$, —CF$_3$, or —SO$_2$CF$_3$.

2. An acrylic copolymer in accordance with claim 1 which has a weight average molecular weight in the range between about 5000-200,000.

3. An acrylic copolymer in accordance with claim 1 which is amorphous and has a glass transition temperature in the range between about 40°-150° C.

4. A nonlinear optical medium consisting of a transparent film of an amorphous acrylic copolymer provided with sidechains having a fused ring structure wherein a heterocyclic nitrogen is adjacent an aromatic ring which is characterized by recurring monomeric units corresponding to the formula:

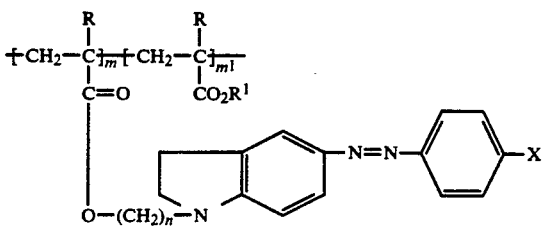

where R is hydrogen or a $C_1$-$C_4$ hydrogen or a $C_1$-$C_4$ alkyl substituent; $R^1$ is a $C_1$-$C_6$ alkyl substituent; m and $m^1$ are integers which total at least 10; n is an integer between 1 and about 10 and X is —CN, —$NO_2$, —CH=C(CN)$_2$, —C(CN)=C(CN)$_2$, —$CF_3$, or —$SO_2CF_3$.

5. A nonlinear optical medium in accordance with claim 4 which is characterized by an external field-induced orientation of aligned polymer side chains, and which exhibits second order nonlinear optical susceptibility $\chi^{(2)}$.

6. In an optical light switch or light modulator device the improvement which comprises a polymeric nonlinear optical component comprising a transparent solid medium of an amorphous acrylic copolymer provided with sidechains having a fused ring structure wherein a heterocyclic nitrogen is adjacent an aromatic ring which is characterized by recurring monomeric units corresponding to the formula:

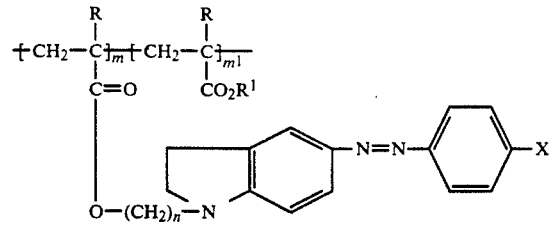

where R is hydrogen or a $C_1$-$C_4$ hydrogen or a $C_1$-$C_4$ alkyl substituent; $R^1$ is a $C_1$-$C_6$ alkyl substituent; m and $m^1$ are integers which total at least 10; n is an integer between 1 and about 10 and X is —CN, —$NO_2$, —CH=C(CN)$_2$, —C(CN)=C(CN)$_2$, or —$SO_2CF_3$.

7. An optical device in accordance with claim 6 wherein the polymer medium exhibits third order nonlinear optical susceptibility $\chi^{(3)}$.

8. An optical device in accordance with claim 6 wherein the polymer medium has a stable orientation of an external field-induced alignment of polymer side chains, and the medium exhibits second order nonlinear optical susceptibility $\chi^{(2)}$.

9. An optical device in accordance with claim 6 wherein the polymeric nonlinear optical component exhibits a light transmission optical loss of less than about one decibel per centimeter.

10. An optical device in accordance with claim 6 which is adapted to double the frequency of an incident laser beam.

* * * * *